(12) United States Patent
Morita (10) Patent No.: US 9,294,376 B2
(45) Date of Patent: Mar. 22, 2016

(54) APPARATUS FOR SEARCHING ROUTE IN LAYER 2 NETWORK

(71) Applicant: FUJITSU LIMITED, Kawasaki-shi, Kanagawa (JP)

(72) Inventor: Mayuko Morita, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 130 days.

(21) Appl. No.: 14/106,903

(22) Filed: Dec. 16, 2013

(65) Prior Publication Data

US 2014/0105072 A1    Apr. 17, 2014

Related U.S. Application Data

(63) Continuation of application No. PCT/JP2011/065119, filed on Jun. 30, 2011.

(51) Int. Cl.
*H04L 12/26* (2006.01)
*H04L 12/46* (2006.01)
*H04L 12/751* (2013.01)

(52) U.S. Cl.
CPC .......... *H04L 43/0876* (2013.01); *H04L 12/462* (2013.01); *H04L 45/02* (2013.01)

(58) Field of Classification Search
CPC ..... H04L 12/462; H04L 45/02; H04L 45/021; H04L 45/24; H04L 45/66
See application file for complete search history.

(56) References Cited

U.S. PATENT DOCUMENTS

| | | | |
|---|---|---|---|
| 2005/0122981 A1* | 6/2005 | Nabae | 370/395.31 |
| 2009/0154461 A1* | 6/2009 | Kitani et al. | 370/392 |
| 2010/0061257 A1 | 3/2010 | Kitawaki et al. | |
| 2010/0091681 A1 | 4/2010 | Sonoda | |

FOREIGN PATENT DOCUMENTS

| | | |
|---|---|---|
| JP | 10-294731 | 11/1998 |
| JP | 2006-270785 | 10/2006 |
| JP | 2010-063058 | 3/2010 |
| WO | 2008133231 | 11/2008 |

OTHER PUBLICATIONS

International Search Report, mailed in connection with PCT/JP2011/065119, and mailed Aug. 2, 2011.

* cited by examiner

*Primary Examiner* — Pao Sinkantarakorn
(74) *Attorney, Agent, or Firm* — Fujitsu Patent Center (57) ABSTRACT

A computer-readable recording medium stores therein a patch determination program causing a computer to execute a process including acquiring, from each of nodes constituting a layer 2 network, node information indicating an adjacent node to be selected as a relay destination of data by each of the nodes among adjacent nodes adjacent to each of the nodes; and extracting each route on which the data is relayed in the layer 2 network based on the acquired node information of each of the nodes and connection information between the nodes.

6 Claims, 10 Drawing Sheets

| DEVICE | IP ADDRESS | MODEL NAME | SNMP COMMUNITY NAME | FAULT INFORMATION |
|---|---|---|---|---|
| HOST TERMINAL (A) | IP (A) | HXXX | Public10 | 1: WARNING |
| L2 SWITCH (C) | IP (3) | SWXXX | Public3 | 0: NORMAL |
| L2 SWITCH (A) | IP (1) | SWXXX | Public1 | 0: NORMAL |
| L2 SWITCH (D) | IP (4) | SWXXX | Public4 | 0: NORMAL |
| L2 SWITCH (B) | IP (2) | SWXXX | - | 0: NORMAL |
| HOST TERMINAL (B) | IP (B) | HXXX | Public100 | 0: NORMAL |

FIG.4

| LINK | TRANS-MISSION SPEED | L2 PATH INFORMATION | FAULT INFORMATION |
|---|---|---|---|
| HOST TERMINAL (A) eth1-L2 SWITCH (C) fa0/1 | 20 G | - | 0: NORMAL |
| L2 SWITCH (C) eth0/1-L2 SWITCH (A) eth0/1 | 20 G | TRILL | 0: NORMAL |
| L2 SWITCH (C) eth0/2-L2 SWITCH (D) eth0/1 | 10 G | TRILL | 0: NORMAL |
| L2 SWITCH (A) eth0/2-L2 SWITCH (B) eth0/1 | 10 G | TRILL | 0: NORMAL |
| L2 SWITCH (D) eth0/2-L2 SWITCH (B) eth0/2 | 10 G | TRILL | 0: NORMAL |
| L2 SWITCH (B) eth0/3-HOST TERMINAL (B) eth1 | 20 G | - | 4: ABNORMAL |

FIG.5

```
ifSpeed OBJECT-TYPE
    SYNTAX    Gauge32
    MAX-ACCESS  read-only
    STATUS    current
    DESCRIPTION
        "An estimate of the interface's current bandwidth in bits
        per second. For interfaces which do not vary in bandwidth
        or for those where no accurate estimation can be made, this
        object should contain the nominal bandwidth. If the
        bandwidth of the interface is greater than the maximum value
        reportable by this object then this object should report its
        maximum value (4,294,967,295) and if HighSpeed must be used
        to report the interace's speed. For a sub-layer which has
        no concept of bandwidth, this object should be zero."
    ::= { ifEntry 5 }
```

FIG.6

```
        rbridgeTrillNbrTable OBJECT-TYPE
SYNTAX      SEQUENCE OF RbridgeTrillNbrEntry
MAX-ACCESS  not-accessible
STATUS      current
DESCRIPTION
    "Information about this Rbridge's TRILL neighbors."
REFERENCE
    "RBridge section 4.4.2.1"
 ::= { rbridgeTrill 3 }
```

APPARATUS FOR SEARCHING ROUTE IN LAYER 2 NETWORK

CROSS-REFERENCE TO RELATED APPLICATION

This application is a continuation of International Application No. PCT/JP2011/065119, filed on Jun. 30, 2011, and designating the U.S., the entire contents of which are incorporated herein by reference.

FIELD

The embodiments discussed herein are related to a route search program and an information processing apparatus.

BACKGROUND

Conventionally, a network device connecting servers and networks implements a spanning tree protocol (STP) for blocking one link as a technique of avoiding a layer 2 (L2) loop. Moreover, for network monitoring, a technique of displaying the STP blocking state on a control terminal is also usually used.

As a technique of monitoring a transmission speed of a network, a transmission speed of a single link connected between devices is monitored as a transmission speed between two devices connected directly. For example, a management information base (MIB) is acquired regularly, using a command such as ifspeed, from each of the devices at both ends of the single link as a monitoring target, and a transmission speed described in the acquired MIB is monitored.

Moreover, to monitor a logical network, there is also known a technique of displaying a plurality of kinds of logical network configurations for each object constituting a network, based on network configuration information collected from each of the objects. A conventional example is described in Japanese Laid-open Patent Publication No. 10-294731.

However, the conventional technique has a problem in that when a network in which a plurality of L2 switches are connected through a multipath is monitored, only a part of path of the multipath is monitored.

Recently, a large-scale network such as a data center has been constructed with a multipath (L2MP) using a technique of transparent interconnection of lots of links (TRILL), and other schemes. In this case, hosts are connected through a plurality of active paths, and the transmission and reception of data is performed using a shortest route with the least number of hops among the active routes.

When such a network with L2MP connection is monitored using the conventional technique, the conventional technique only allows monitoring of a route between two adjacent nodes, or one route, as a route connected in series, even when routes between two adjacent nodes are connected in parallel. Thus, the information of a plurality of paths altogether is not monitored. That is, the conventional technique only allows monitoring of information of one route among routes used actually, although hosts connected through L2 switches are connected via the paths.

SUMMARY

According to an aspect of an embodiment, a computer-readable recording medium stores therein a route search program causing a computer to execute a process including acquiring, from each of nodes constituting a layer 2 network, node information indicating an adjacent node to be selected as a relay destination of data by each of the nodes among adjacent nodes adjacent to each of the nodes; and extracting each route on which the data is relayed in the layer 2 network based on the acquired node information of each of the nodes and connection information between the nodes.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments of the present invention will be explained with reference to accompanying drawings. The embodiments do not limit the invention.

[a] First Embodiment

Entire Configuration

Figure 1:
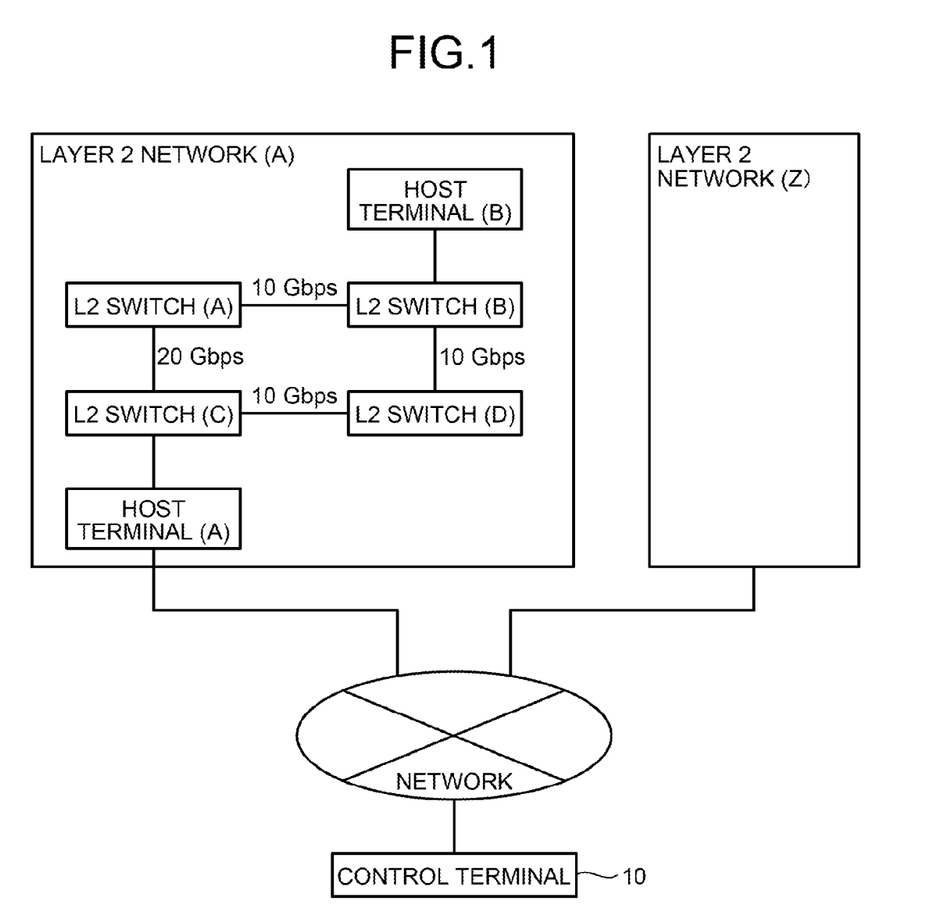
FIG. 1 is a diagram illustrating an example of an entire configuration of a system according to a first embodiment.

FIG. 1 is a diagram illustrating an example of an entire configuration of a system according to a first embodiment. As illustrated in FIG. 1, a plurality of nodes connected to one another constitute a layer 2 network in the system. In the system illustrated in FIG. 1, a control terminal 10 and the layer 2 network (A) are connected to each other through the Internet, etc. The control terminal 10 and the layer 2 network (Z) are also connected to each other in the same manner. The number of networks and devices, etc., illustrated in FIG. 1 is merely an example, and the embodiment is not limited to what is illustrated therein.

The layer 2 network (A) includes a host terminal (A), a host terminal (B), an L2 switch (A), an L2 switch (B), an L2 switch (C), and an L2 switch (D). The network configuration illustrated in FIG. 1 is merely an example, and the embodiment is not limited to what is illustrated therein. Moreover, the configuration of the layer 2 network (Z) may be same as or different from the configuration of the layer 2 network (A). Thus, the detailed explanation thereof is omitted here.

Then, in the layer 2 network (A), the host terminal (A) and the L2 switch (C), the L2 switch (C) and the L2 switch (A), and the L2 switch (C) and the L2 switch (D) are connected to each other, respectively. Similarly, the L2 switch (A) and the L2 switch (B), the L2 switch (B) and the L2 switch (D), and the L2 switch (B) and the host terminal (B) are connected to each other, respectively.

The host terminal (A) and the host terminal (B) may be a server device such as a web server and a database (DB) server, or may be a personal computer. The control terminal 10 performs processing as a simple network management protocol (SNMP) manager, while the L2 switches and the host terminals perform processing as SNMP agents. Thus, the control terminal 10 can acquire device information and fault information from the L2 switches and the host terminals.

Each L2 switch is a data relaying device that relays data to a destination, and is a network device such as a switching hub and a bridge. Each L2 switch is a device achieving an L2MP such as TRILL, and makes routes redundant while keeping such routes in the active state and selects a shortest route to transmit data. The L2 switches store routing information using, for example, a forwarding database (FDB) that controls routing information and an address resolution protocol (ARP) in an integrated manner.

For example, each L2 switch stores "destination net, mask, next node, media access control (MAC) address, and port" in an associated manner. As an example, each L2 switch stores "10.0.0.0, 255.0.0.0, 192.168.1.1, 00:00:00:00:ee:ee, 1", etc. This indicates that when the L2 switch relays data destined to the address "10.0.0.0", it outputs the data to a device identified with "192.168.1.1". That is, each L2 switch stores not only connection information of physical connection but also address information of a device selected, when relaying data, as a relay destination.

The control terminal 10 is a computer that monitors a network connected to the control terminal 10. The control terminal 10 acquires, from each of nodes constituting the layer 2 network, node information indicating an adjacent node to be selected as a relay destination of data by the node among adjacent nodes of the node. Then, the control terminal 10 extracts routes on which data is relayed in the layer 2 network, using the acquired node information of each node and the connection information between nodes that is stored in a storage unit, etc.

In such a manner, it is possible that the control terminal 10 specifies not connection information indicating merely physical connection, etc., but a relay destination to which each node relays data. Thus, the control terminal 10 can extract each of paths in the layer 2 network without monitoring paths on a route between two adjacent nodes. Consequently, the control terminal 10 can monitor each path of the multipath constituting the layer 2 network.

Entire Configuration

Figure 2:
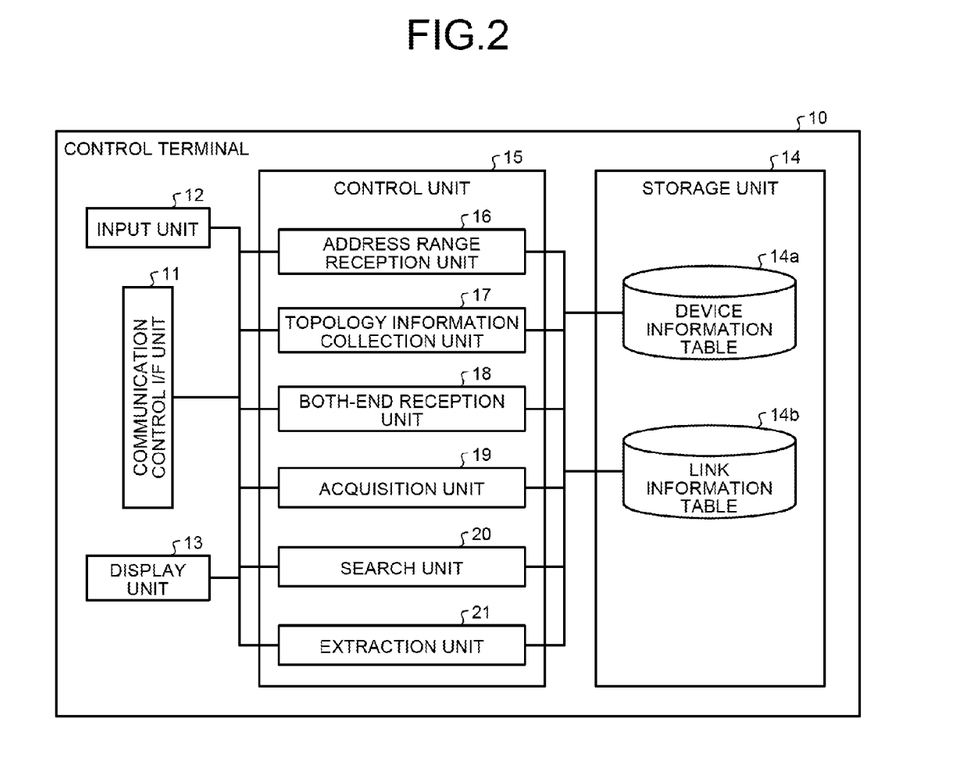
FIG. 2 is a functional block diagram illustrating a configuration of a control terminal according to the first embodiment.

FIG. 2 is a functional block diagram illustrating a configuration of the control terminal according to the first embodiment. As illustrated in FIG. 2, the control terminal 10 includes a communication control interface (I/F) unit 11, an input unit 12, a display unit 13, a storage unit 14, and a control unit 15. The storage unit 14 is a storage device such as a semiconductor element, a hard disk, and a memory, for example. The control unit 15 is an electronic circuit such as a central processing unit (CPU) or an integrated circuit such as a field-programmable gate array (FPGA).

The communication control I/F unit 11 is an interface for controlling communication between the control terminal 10 and another device. The communication control I/F unit 11 establishes web communication with a user terminal, receives a network range in which a multipath is searched from a user terminal, and transmits information of the searched multipath to a user terminal, for example.

The input unit 12 is an input device such as a keyboard and a mouse and provides a pointing device in cooperation with the display unit 13. For example, the input unit 12 receives various kinds of operations from an administrator, etc., and performs output to the control unit 15, etc. The display unit 13 is a display device such as a display and a touch panel, and displays a result of multipath search performed by the control unit 15 and a web screen output by the control unit 15, etc., for example.

The storage unit 14 has an area for storing programs executed by the control unit 15, a work area used temporarily when the control unit 15 performs processing, etc. In addition to the areas, the storage unit 14 has a device information table 14a and a link information table 14b.

Figure 3:
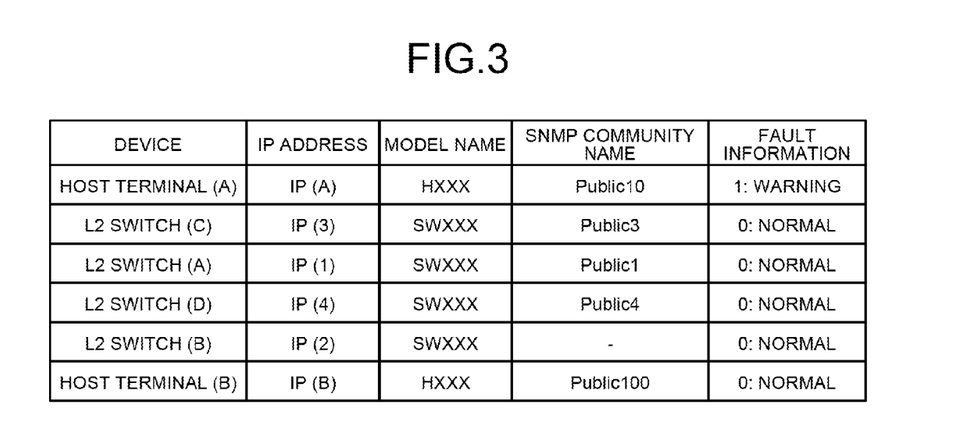
FIG. 3 is a diagram illustrating an example of information stored in a device information table.

The device information table 14a stores information of devices under the control of the control terminal 10. FIG. 3 is a diagram illustrating an example of information stored in the device information table. As illustrated in FIG. 3, the device information table 14a stores "device, IP address, model name, SNMP community name, and fault information" in an associated manner.

The "device" stored here indicates a host name, etc., of a node such as a server and a network device under the control of the control terminal 10. The "IP address" indicates an internet protocol address assigned to a device. The "model name" indicates a product name or a device name of a device. The "SNMP community name" indicates an identifier, etc., for grouping monitoring targets, and the communication of information is achieved by sharing a community name between an agent and a manager. The "fault information" indicates information of faults collected by the control terminal using the SNMP, etc. The fault information is updated regularly by the SNMP.

FIG. 3 illustrates that the host terminal (A) whose device name is HXXX and whose SNMP community name is Public10 can perform communication using an IP (A) and a fault occurs on a part of the communication route. FIG. 3 also illustrates that the L2 switch (D) whose device name is SWXXX and whose SNMP community name is Public4 can perform communication using an IP (4) and currently functions normally.

Figure 4:
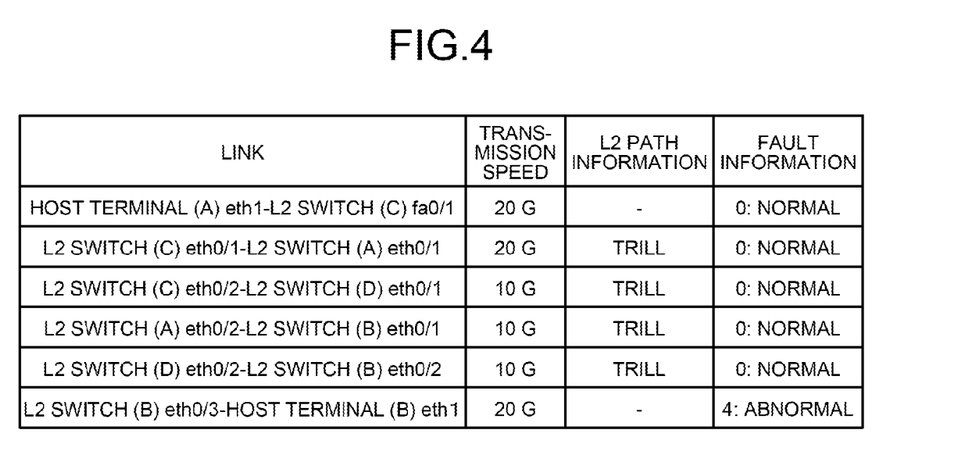
FIG. 4 is a diagram illustrating an example of information stored in a link information table.

The link information table 14b stores physical connection information of a network as a monitoring target. FIG. 4 is a diagram illustrating an example of information stored in the link information table. As illustrated in FIG. 4, the link information table 14b stores "link, transmission speed, L2 path information, and fault information" in an associated manner.

The "link" stored here indicates connection information of physical connection of devices, and the "transmission speed" indicates a line speed set for a link. The "L2 path information" indicates a network state of layer 2 communication used in a network as a monitoring target, and the "fault information" indicates whether a fault has occurred on a link. FIG. 4 illustrates that a communication interface "eth1" of the host terminal (A) and a communication interface "fa0/1" of the L2 switch (C) are connected through a communication line with a transmission speed of "20 Gbps" and the link functions normally. FIG. 4 also illustrates that a communication interface "eth0/2" of the L2 switch (A) and a communication interface "eth0/1" of the L2 switch (B) are connected through a communication line with a transmission speed of "10 Gbps" and the link functions normally. In addition, FIG. 4 illustrates that the latter route is made redundant by TRILL. The fault information is updated regularly by the SNMP.

The control unit 15 is a processing unit that controls the entire processing of the control terminal 10, and includes an address range reception unit 16, a topology information collection unit 17, a both-end reception unit 18, an acquisition unit 19, a search unit 20, and an extraction unit 21.

The address range reception unit 16 is a processing unit that receives an address range of a network as a monitoring target from a user, an administrator, etc. For example, when the address range reception unit 16 has received an instruction for searching multipath information or monitoring a multipath from a user terminal through the communication control I/F unit 11, or has received the same instruction from an administrator through the input unit 12, it displays a web screen for requesting an input of an IP address range. For example, the address range reception unit 16 displays the web screen on the display unit 13, or transmits the web screen to a user terminal. Then, the address range reception unit 16 receives an address range or a network range such as from 192.168.1.0 to 192.168.1.20, and outputs the received information to the topology information collection unit 17.

The topology information collection unit 17 is a processing unit that collects information of a network as a monitoring target or a searching target and information of servers and L2 switches, etc., constituting the network. For example, the topology information collection unit 17 performs SNMP access relative to the IP address range received by the address range reception unit 16 while specifying a predetermined SNMP community name. Then, the topology information collection unit 17 acquires, from each of the devices in the IP address range, a MIB collected with a discovery protocol such as a link layer discovery protocol-management information base (LLDP-MIB). Thereafter, the topology information collection unit 17 stores the collected information in the device information table 14a or the link information table 14b.

For example, the topology information collection unit 17 performs SNMP access relative to each address from 192.168.1.0 to 192.168.1.20 while specifying Public3 as an SNMP community name. It is supposed that the device having responded to the SNMP access is the L2 switch (C). In such a case, the topology information collection unit 17 acquires a MIB, for example, as SNMP access. Then, the topology information collection unit 17 extracts a device, an IP address, a model name, and fault information from the MIB, and stores them in the device information table 14a so that they are associated with the specified community name (Public3). Moreover, the topology information collection unit 17 extracts a transmission speed, L2 path information, etc., from the MIB, and stores them in the link information table 14b.

Figure 5:
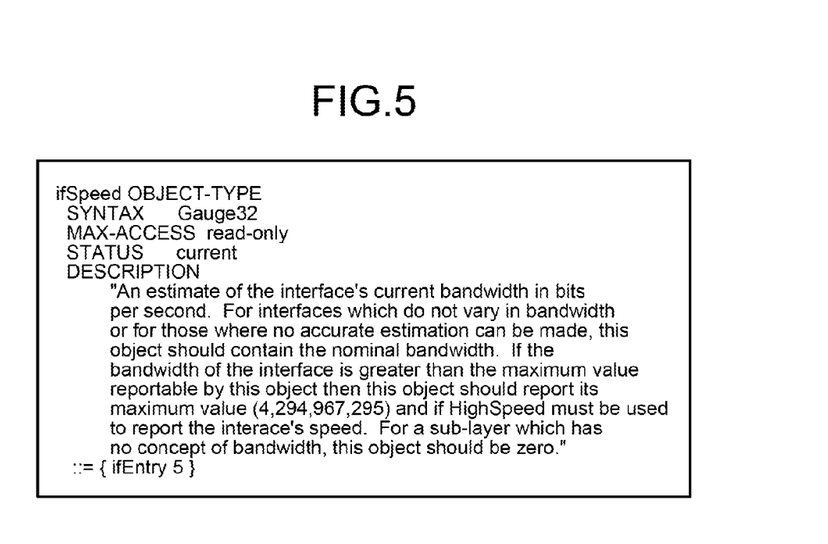
FIG. 5 is a diagram illustrating an example of a MIB for acquiring a transmission speed.

Here, an example of acquisition of a transmission speed, as an example of the MIB, will be described. FIG. 5 is a diagram illustrating an example of a MIB for acquiring a transmission speed. In this example, the topology information collection unit 17 acquires the MIB illustrated in FIG. 5 from the L2 switch (C) having responded to the SNMP access. Then, the topology information collection unit 17 specifies "ifEntry 5" illustrated in FIG. 5 as an object identifier (OID) and "Public3" as an SNMP community name of the L2 switch (C), and performs SNMP access relative to the L2 switch (C). Consequently, the topology information collection unit 17 can acquire a transmission speed from the L2 switch (C). For example, the topology information collection unit 17 can also acquire a transmission speed for each interface by specifying an interface, etc.

The both-end reception unit 18 is a processing unit that receives addresses of terminals at both ends as monitoring targets or multipath searching targets. For example, when the topology information collection unit 17 has collected topology information, the both-end reception unit 18 displays a screen for receiving addresses of terminals at both ends on a user terminal, the display unit 13, etc. Then, the both-end reception unit 18 outputs the received addresses at both ends to the acquisition unit 19.

For example, the both-end reception unit 18 receives "IP (A)" as an IP address of a starting point and "IP(B)" as an IP address of an ending point, and outputs an instruction for extracting a multipath from the IP (A) to the IP (B) to the acquisition unit 19, etc. Although the IP addresses of both points are received here, as an example, MAC addresses of both points may be received alternatively. When the both-end reception unit 18 has not received addresses, it outputs an instruction for searching a multipath in a network formed within an address range received by the address range reception unit 16, to the acquisition unit 19, etc.

The acquisition unit 19 is a processing unit that searches adjacent nodes adjacent to a first node based on connection information between nodes and acquires node information of nodes as relay destinations of data from the searched adjacent nodes. For example, the acquisition unit 19 specifies adjacent nodes of the starting point terminal and the ending point terminal that have been received by the both-end reception unit 18, based on the link information table 14b. Then, the acquisition unit 19 acquires, based on the FDB of the specified adjacent node of the starting point terminal, node information of a node to be selected as a relay destination of data by the adjacent node, associates the node information of the relay source node and the node information of the relay destination node, and stores the associated information in a work area of the storage unit 14, etc.

For example, a route from the host terminal (A) to the host terminal (B) in the layer 2 network (A) illustrated in FIG. 1 will be described using a search example. It is supposed that the both-end reception unit 18 receives the host terminal (A) as a starting point terminal and the host terminal (B) as an ending point terminal. In this case, the acquisition unit 19 refers to the link information table 14b to specify the L2 switch (C) as an adjacent node connected to the host terminal (A) at the starting point. Similarly, the acquisition unit 19 refers to the link information table 14b to specify the L2 switch (B) as an adjacent node connected to the host terminal (B) at the ending point. The acquisition unit 19 stores the starting point terminal, the ending point terminal, the adjacent node of the starting point terminal, and the adjacent node of the ending point terminal in the work area.

Subsequently, the acquisition unit 19 specifies the SNMP community name "Public3" of the L2 switch (C) that is an adjacent node of the host terminal (A), based on the device information table 14a. Then, the acquisition unit 19 performs SNMP access relative to the L2 switch (C) while specifying the "Public3" as an SNMP community name. Thereafter, the acquisition unit 19 acquires an entry of the FDB as a MIB from the L2 switch (C) and specifies node information of a node as the next relay destination based on the acquired MIB.

Figure 6:
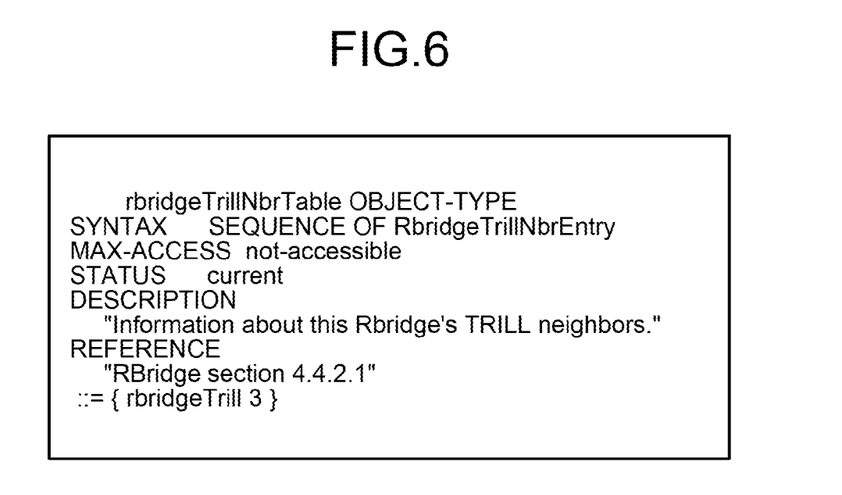
FIG. 6 is a diagram illustrating a MIB indicating node information.

Here, an example of acquisition of an entry of the FDB as a MIB will be described. FIG. 6 is a diagram illustrating an example of a MIB indicating node information. When the acquisition unit 19 performs SNMP access relative to the L2 switch (C) while specifying the "Public3" as an SNMP community name, it acquires a MIB illustrated in FIG. 6. Then, the acquisition unit 19 extracts "rbridge Trill 3" from the MIB illustrated in FIG. 6. Next, the acquisition unit 19 specifies the "rbridge Trill 3" as an object identifier and the "Public3" as an SNMP community name, and performs SNMP access relative to the L2 switch (C). Consequently, the acquisition unit 19 acquires "L2 switch (A)" as a device name, for example, and can specify the L2 switch (A) as the next relay destination following the L2 switch (C).

The search unit 20 is a processing unit that repeatedly acquires node information until an adjacent node of the ending point or an already-acquired relay node is detected. That is, the search unit 20 determines whether the node information acquired by the acquisition unit 19 is of an adjacent node of the ending point. Then, when the node information is of an adjacent node of the ending point, the search unit 20 finishes search of node information and outputs an instruction for extracting a multipath to the extraction unit 21.

When the node information is not of an adjacent node of the ending point, the search unit 20 further acquires node information of an adjacent node by the same method as used by the acquisition unit 19 and determines whether the acquired node information is of an adjacent node of the ending point.

When the node information acquired by the acquisition unit 19 has been already acquired, the search unit 20 controls so that processing for specifying node information is not further performed relative to the already-acquired node information. In this manner, the search unit 20 repeatedly searches node information until an adjacent node of the ending point is specified as node information. The search unit 20 stores node information of the specified nodes in a work area of the storage unit 14, etc.

In case of the above example, the search unit 20 determines that the L2 switch (C) and the L2 switch (A) acquired by the acquisition unit 19 are different from the L2 switch (B) that is an adjacent node of the ending point. Here, when the search unit 20 determines that both match, it finishes the processing.

Subsequently, the search unit 20 specifies the SNMP community name "Public1" of the L2 switch (C) that is an adjacent node of the L2 switch (A), based on the device information table 14a. Then, the search unit 20 performs SNMP access relative to the L2 switch (A) while specifying the "Public1" as an SNMP community name. Thereafter, the search unit 20 acquires an entry of the FDB as a MIB from the L2 switch (A), and specifies the node information of the next node based on the acquired MIB. Here, when the specified node information of the next node is not of an adjacent node of the ending point, the search unit 20 performs the above processing regarding the node information of another next node.

Returning to FIG. 2, the extraction unit 21 is a processing unit that extracts a multipath formed in a network. For example, when the extraction unit 21 has received an instruction for extracting a multipath from the search unit 20, it acquires the node information acquired by the acquisition unit 19 and the search unit 20 from the work area of the storage unit 14, etc. Then, the extraction unit 21 combines relay source nodes with relay destination nodes and extracts paths from the host terminal (A) to the host terminal (B).

The extraction unit 21 acquires, for each of the extracted paths, a transmission speed of a link forming the path based on the link information table 14b. Then, the extraction unit 21 extracts, for each path, a minimum transmission speed among transmission speeds of links forming the path. Subsequently, the extraction unit 21 calculates a value acquired by adding the extracted minimum transmission speeds of paths. The extraction unit 21 also extracts a minimum transmission speed on communicable routes of each path. It is possible to confirm whether a route is communicable based on fault information in the link information table 14b or the device information table 14a.

Then, the extraction unit 21 displays, on the display unit 13, each of paths from the host terminal (A) to the host terminal (B), a value acquired by adding minimum transmission speeds of paths, and a minimum transmission speed on communicable routes among paths from the host terminal (A) to the host terminal (B). The extraction unit 21 transmits such information to a user terminal.

Processing Flow

Figure 7:
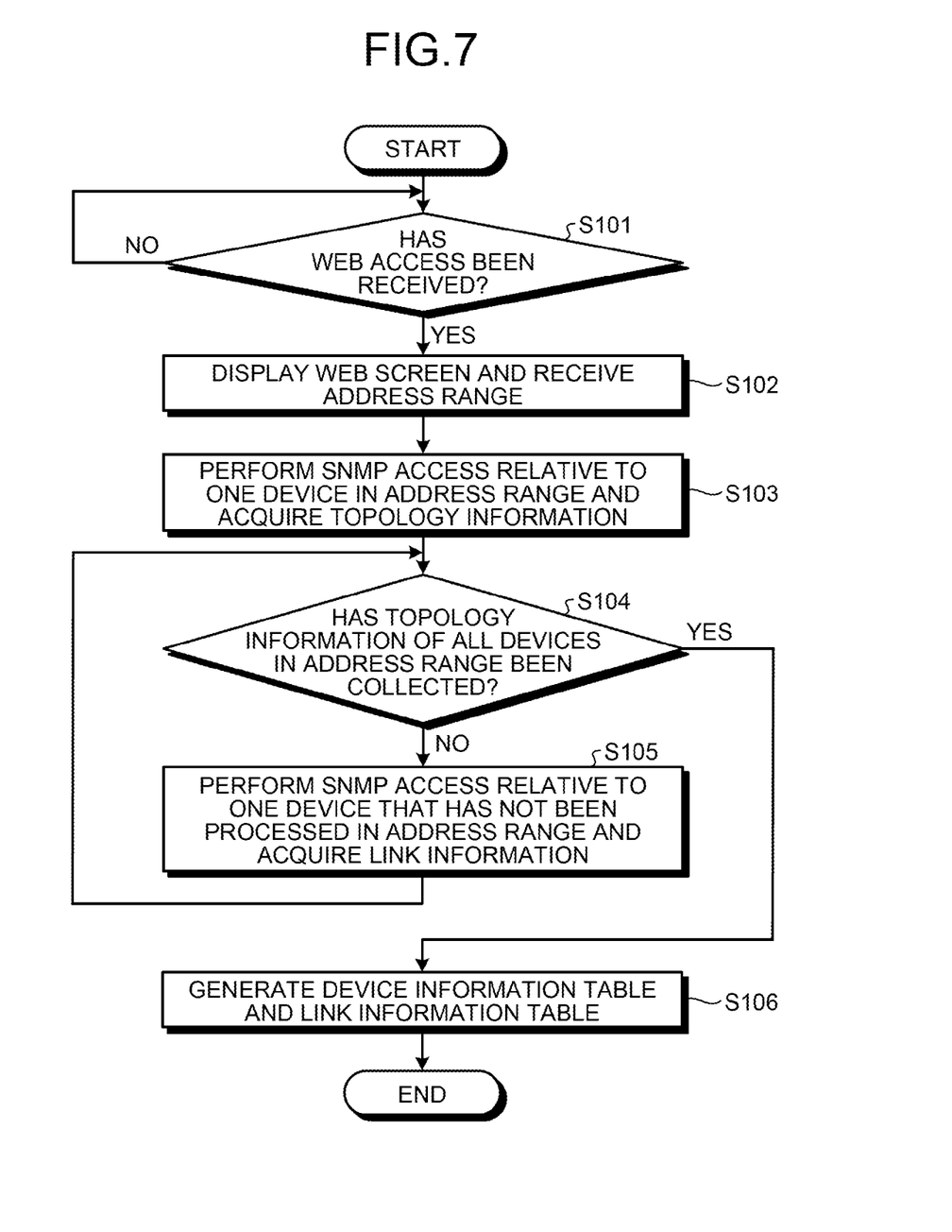
FIG. 7 is a flowchart illustrating a processing flow of collecting topology information.
Figure 8:
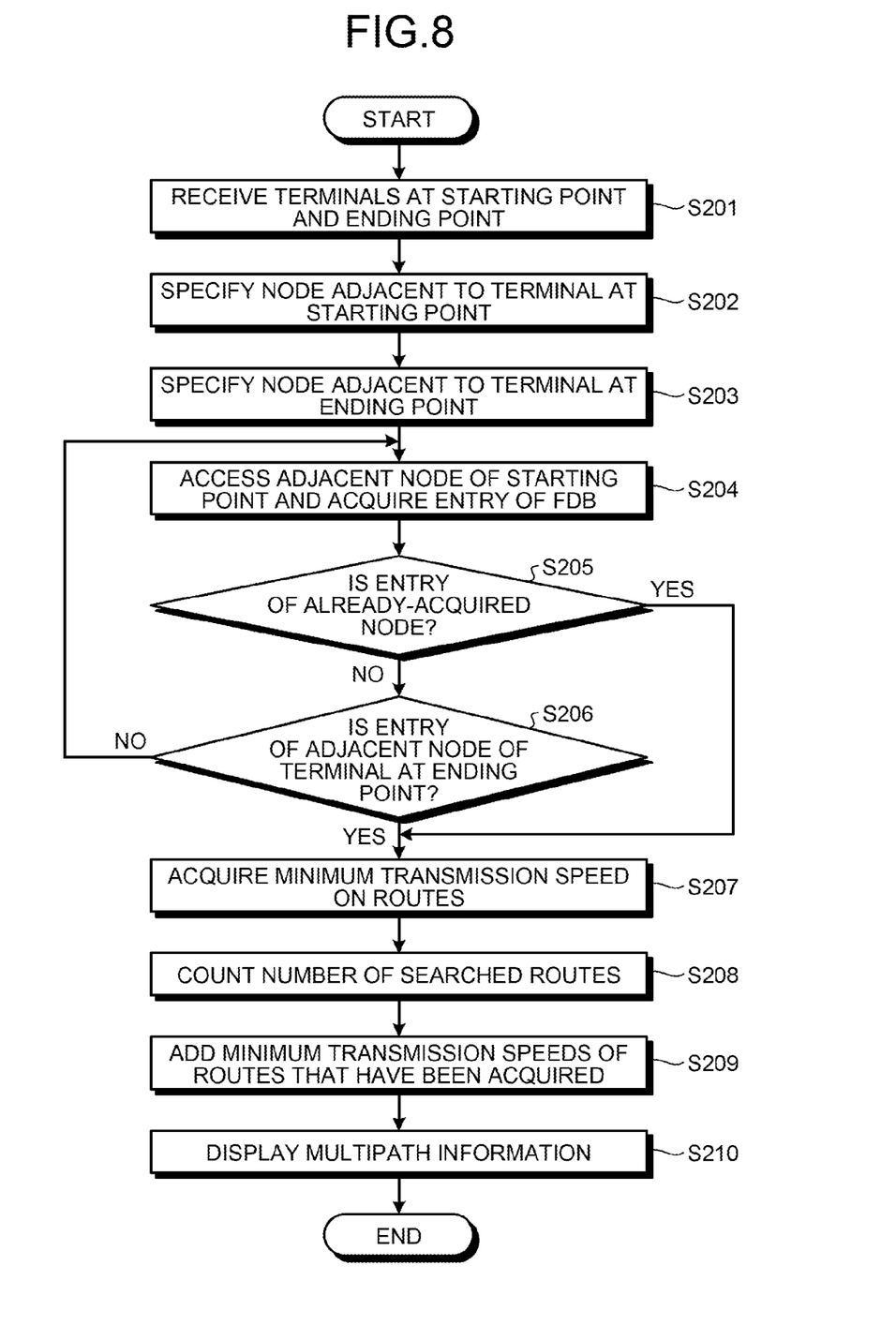
FIG. 8 is a flowchart illustrating a processing flow of detecting a multipath.

Next, the processing flow will be described with reference to FIG. 7 and FIG. 8. FIG. 7 is a flowchart illustrating a processing flow of collecting topology information. FIG. 8 is a flowchart illustrating a processing flow of detecting a multipath.

Collection of Topology Information

As illustrated in FIG. 7, when the address range reception unit 16 has received web access from a user terminal, etc. (Yes at S101), it displays a web screen to receive an address range of multipath search target (S102).

Subsequently, the topology information collection unit 17 performs SNMP access relative to one device in the address range and acquires topology information (S103). Here, the topology information collection unit 17 also acquires a transmission speed, etc.

Then, the topology information collection unit 17 performs, until the topology information of all devices in the received address range is collected (No at S104), SNMP access relative to a device that has not been processed and acquires topology information (S105).

When the topology information collection unit 17 has collected topology information of all devices in the received address range (Yes at S104), it generates the device information table 14a and the link information table 14b based on the collected topology information (S106).

Detection of Multipath

As illustrated in FIG. 8, the both-end reception unit 18 receives address information of terminals at a starting point and an ending point (S201). Subsequently, the acquisition unit 19 specifies an adjacent node adjacent to the node at the starting point (S202) and an adjacent node adjacent to the node at the ending point (S203).

Then, the acquisition unit 19 performs SNMP access relative to the adjacent node of the starting point and acquires an entry of the FDB (S204). When the acquired entry is not of an already-acquired node (No at S205) or of the adjacent node of the ending point (No at S206), the processing returns to S204, and the search unit 20 searches a node as the next relay destination following the adjacent node, and performs the following same processing.

When the acquired entry is of an already-acquired node (Yes at S205) or of the adjacent node of the ending point (Yes at S206), the search unit 20 performs the processing at S207 and the following.

That is, the extraction unit 21 acquires minimum transmission speeds on routes based on the link information table 14b (S207) and counts the number of searched routes (S208). Then, the extraction unit 21 adds the minimum transmission speeds of routes that have been acquired (S209). Thereafter, the extraction unit 21 displays the information acquired at S207 to S209, as information of the multipath, on the display unit 13 (S210).

Concrete Example

Figure 9:
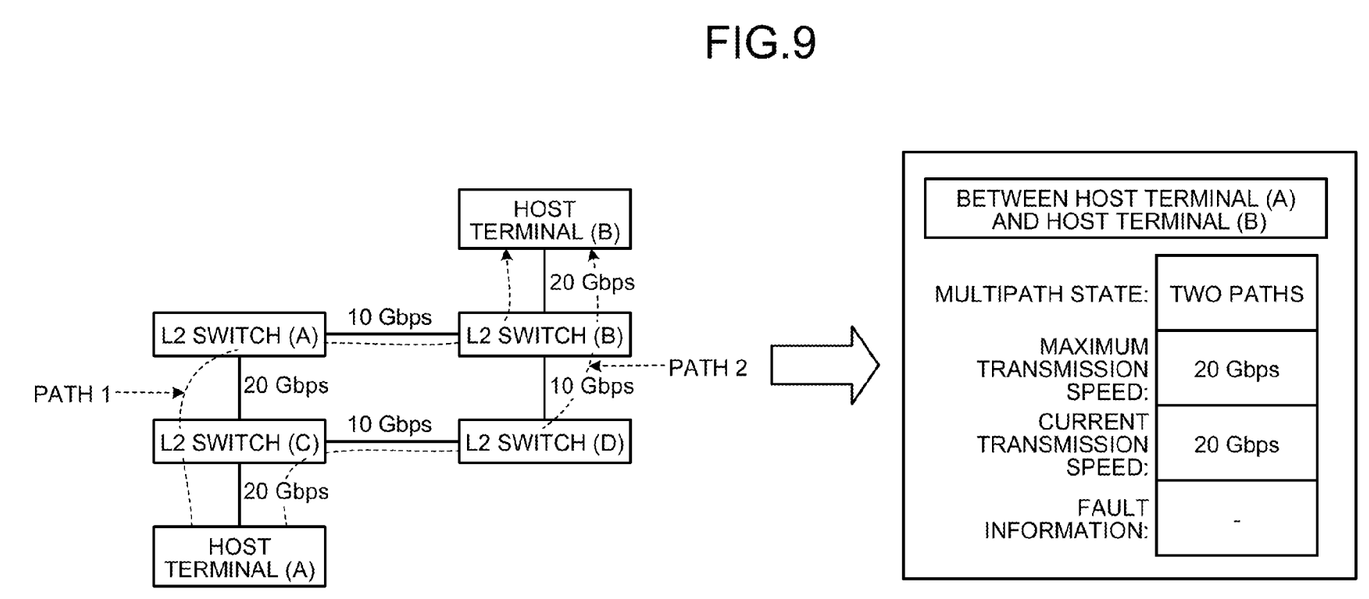
FIG. 9 is a diagram for explaining a concrete example of multipath detection.

Next, a concrete example of multipath detection will be described with reference to FIG. 9. FIG. 9 is a diagram for explaining a concrete example of multipath detection. The layer 2 network configuration illustrated in FIG. 9 is same as in FIG. 1, and thus the detailed explanation thereof is omitted. In the layer 2 network configuration illustrated in FIG. 9, the control terminal 10 detects paths from the host terminal (A) to the host terminal (B), for example. Here, the control terminal 10 has collected topology information and already has the device information table 14a and the link information table 14b.

In such a condition, the acquisition unit 19 of the control terminal 10 refers to the link information table 14b to specify the L2 switch (C) as an adjacent node connected to the host terminal (A). Similarly, the acquisition unit 19 refers to the link information table 14b to specify the L2 switch (B) as an adjacent node connected to the host terminal (B). As a result, the acquisition unit 19 associates "host terminal (A), L2 switch (C)" and "L2 switch (B), host terminal (B)" as "relay source node, relay destination node", and stores them in the work area of the storage unit 14.

Subsequently, the acquisition unit 19 specifies the SNMP community name "Public3" of the L2 switch (C) based on the device information table 14a and performs SNMP access relative to the L2 switch (C) while specifying the "Public3" as an SNMP community name. Thereafter, the acquisition unit 19 acquires an entry of the FDB as a MIB from the L2 switch (C) and specifies the L2 switch (A) and the L2 switch (D) as the next relay destination nodes based on the acquired MIB. Here, the search unit 20 determines that the specified L2 switch (A) and L2 switch (D) do not match the adjacent node of the host terminal (A) or the adjacent node of the host terminal (B) and they are nodes that have not been acquired. Thus, the acquisition unit 19 associates "L2 switch (C), L2 switch (A)" and "L2 switch (C), L2 switch (D)" as "relay source node, relay destination node", and stores them in the work area of the storage unit 14.

Subsequently, the acquisition unit 19 specifies the SNMP community name "Public1" of the L2 switch (A) based on the device information table 14a, and performs SNMP access relative to the L2 switch (A) while specifying the "Public1" as an SNMP community name. Thereafter, the acquisition unit 19 acquires an entry of the FDB as a MIB from the L2 switch (A) and specifies the L2 switch (C) and the L2 switch (B) as the relay destination nodes of the L2 switch (A) based on the acquired MIB. Here, the specified L2 switch (C) is an already-acquired node. Thus, the search unit 20 does not search relay nodes regarding the L2 switch (C). Moreover, the L2 switch (B) specified in the same manner matches the adjacent node of the host terminal (B). Thus, the search unit 20 does not search relay nodes regarding the L2 switch (B) and finishes the processing.

Similarly, the acquisition unit 19 specifies the SNMP community name "Public4" of the L2 switch (D) based on the device information table 14a, and performs SNMP access relative to the L2 switch (D) while specifying the "Public4" as an SNMP community name. Thereafter, the acquisition unit 19 acquires an entry of the FDB as a MIB from the L2 switch (D) and specifies the L2 switch (C) and the L2 switch (B) as the relay destination nodes of the L2 switch (D) based on the acquired MIB. Here, the specified L2 switch (C) is an already-acquired node. Thus, the search unit 20 does not search relay nodes regarding the L2 switch (C). Moreover, the L2 switch (B) specified in the same manner matches the adjacent node of the host terminal (B). Thus, the search unit 20 does not search relay nodes regarding the L2 switch (B) and finishes the processing.

Thus, the acquisition unit 19 associates "L2 switch (A), L2 switch (B)" and "L2 switch (D), L2 switch (B)" as "relay source node, relay destination node", and stores them in the work area of the storage unit 14.

As a result of relay node search performed in this manner, the acquisition unit 19 can acquire "host terminal (A), L2 switch (C)" and "L2 switch (B), host terminal (B)" as "relay source node, relay destination node". Similarly, the acquisition unit 19 can acquire "L2 switch (C), L2 switch (A)" and "L2 switch (C), L2 switch (D)" as "relay source node, relay destination node". Similarly, the acquisition unit 19 can acquire "L2 switch (A), L2 switch (B)" and "L2 switch (D), L2 switch (B)" as "relay source node, relay destination node".

Based on the result, the extraction unit 21 extracts a path 1 from the "host terminal (A)" to the "host terminal (B)" through the "L2 switch (C)", the "L2 switch (A)", and the "L2 switch (B)". Moreover, the extraction unit 21 extracts a path 2 from the "host terminal (A)" to the "host terminal (B)" through the "L2 switch (C)", the "L2 switch (D)", and the "L2 switch (B)".

Then, the extraction unit 21 refers to the link information table 14b to acquire a transmission speed "20 Gbps" between the "host terminal (A)" and the "L2 switch (C)". Similarly, the extraction unit 21 acquires a transmission speed "20 Gbps" between the "L2 switch (C)" and the "L2 switch (A)". Similarly, the extraction unit 21 acquires a transmission speed "10 Gbps" between the "L2 switch (A)" and the "L2 switch (B)". Similarly, the extraction unit 21 acquires a transmission speed "20 Gbps" between the "L2 switch (B)" and the "host terminal (B)". As a result, the extraction unit 21 can acquire "10 Gbps" as the minimum transmission speed of the path 1.

Moreover, the extraction unit 21 refers to the link information table 14b to acquire a transmission speed "20 Gbps" between the "host terminal (A)" and the "L2 switch (C)". Similarly, the extraction unit 21 acquires a transmission speed "10 Gbps" between the "L2 switch (C)" and the "L2 switch (D)". Similarly, the extraction unit 21 acquires a transmission speed "10 Gbps" between the "L2 switch (D)" and the "L2 switch (B)". Similarly, the extraction unit 21 acquires a transmission speed "20 Gbps" between the "L2 switch (B)" and the "host terminal (B)". As a result, the extraction unit 21 can acquire "10 Gbps" as the minimum transmission speed of the path 2.

As a result of these, the extraction unit 21 extracts the facts that the current number of multipath is "two", the maximum transmission speed is "20 Gbps", which is acquired by adding the minimum transmission speeds of both paths, and the current transmission speed is "20 Gbps", which is acquired by adding the minimum transmission speeds of both paths. That is, the extraction unit 21 extracts the facts that 20 Gbps is available in the entire multipath and the entire of 20 Gbps can be used currently. Then, as illustrated in FIG. 9, the extraction unit 21 displays the multipath state, the maximum transmission speed, the current transmission speed, and fault information on the display unit 13, or transmits them to a user terminal. The information displayed here and the display format thereof can be set and changed arbitrarily.

In this manner, it is possible that the control terminal 10 of the first embodiment specifies not a physical connection state in the layer 2 network but a node actually recognized as a relay destination of data by each switch in the layer 2 network. Thus, the control terminal 10 can extract each of paths in the layer 2 network without monitoring the paths in the conventional end-to-end manner. Consequently, the control terminal 10 can detect a multipath in the layer 2 network and monitor each path of the multipath. Moreover, the L2 multipath routes between two nodes can be recognized visually. In addition, the maximum transmission speed (bandwidth) between two nodes can be grasped.

[b] Second Embodiment

Next, a second embodiment describes a case in which fault information is extracted together with a multipath between devices and visualized. The network configuration, etc., are same as the configuration illustrated in FIG. 1.

Figure 10:
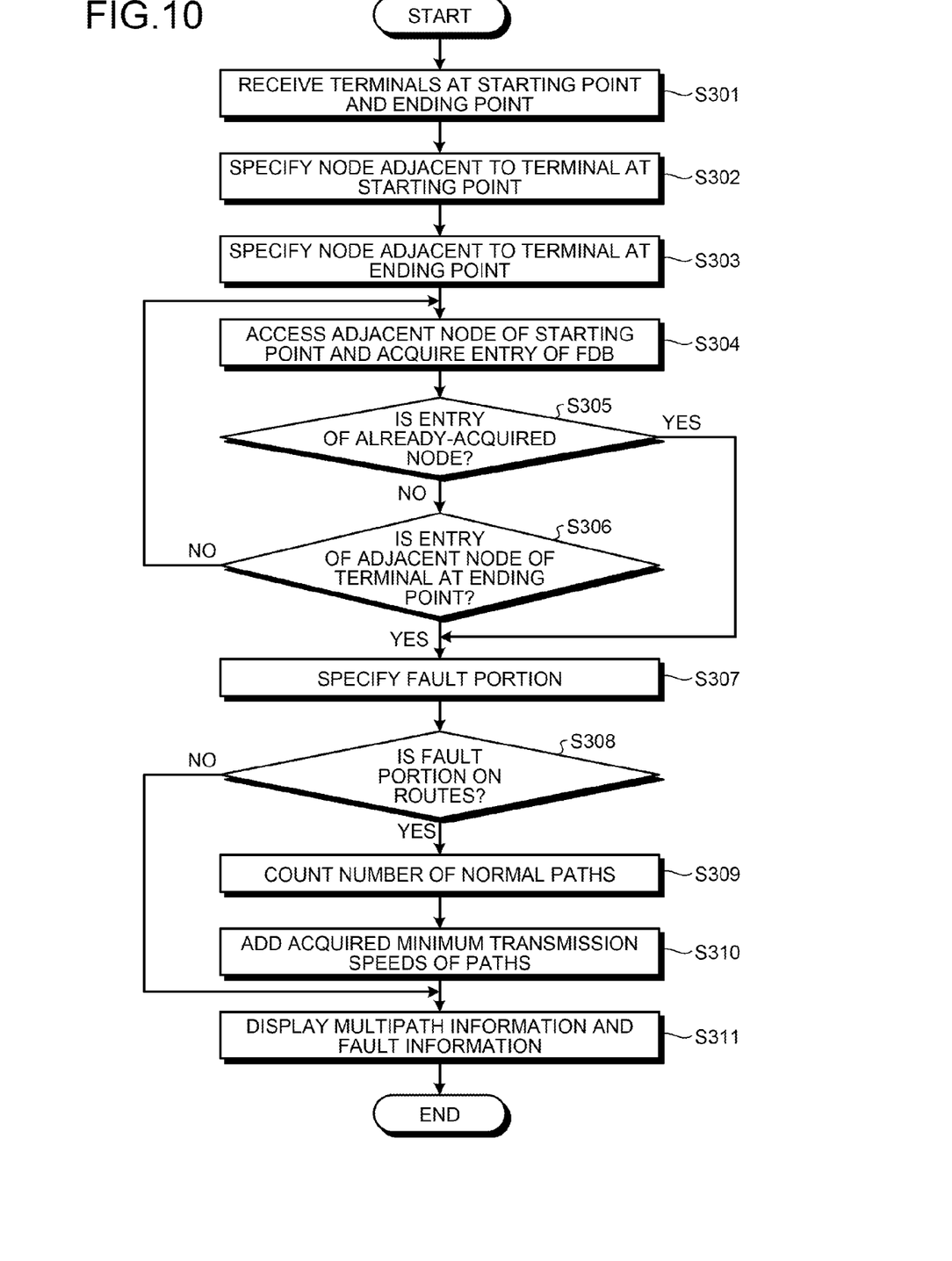
FIG. 10 is a flowchart illustrating a processing flow of detecting a multipath according to a second embodiment.

FIG. 10 is a flowchart illustrating a processing flow of detecting a multipath according to the second embodiment. The processing from S301 to S306 illustrated in FIG. 10 is same as the processing from S201 to S206. Thus, the detailed explanation thereof is omitted.

The extraction unit 21 of the control terminal 10 that has specified a relay destination node for each node at S301 to S306 refers to fault information in the link information table 14b to specify a fault portion (S307). Subsequently, the extraction unit 21 determines whether the specified fault portion is on any path specified at S301 to S306 (S308).

When the specified fault portion is not on any path (No at S308), the extraction unit 21 performs the processing at S311. Thereafter, the information of the multipath may be displayed as described in FIG. 8 of the first embodiment, etc. In contrast to the above case, when the specified fault portion is on a path (Yes at S308), the extraction unit 21 acquires the minimum transmission speed on paths based on the link information table 14b and counts the number of normal paths among the searched paths (S309).

Then, the extraction unit 21 adds minimum transmission speeds of the normal paths (S310). Thereafter, the extraction unit 21 displays the information and fault information acquired at S307 to S310, as information of the multipath, on the display unit 13 (S311).

Figure 11:
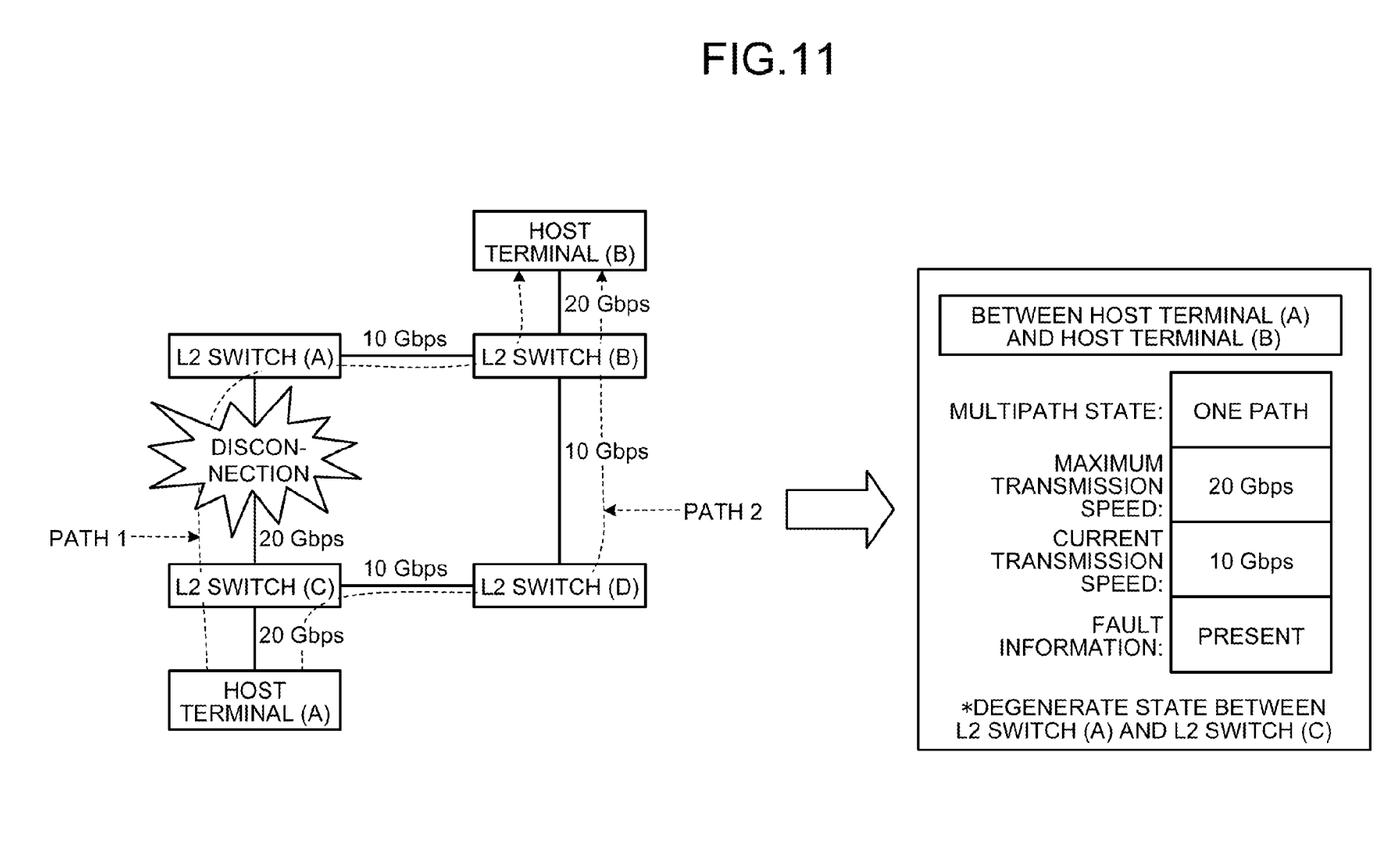
FIG. 11 is a diagram for explaining a concrete example of multipath detection during a fault.

Subsequently, a concrete example will be described with reference to FIG. 11. FIG. 11 is a diagram for explaining a concrete example of multipath detection during a fault. The network configuration illustrated in FIG. 11 is same as in FIG. 1 and FIG. 9, and is different in that a disconnection occurs between the L2 switch (A) and the L2 switch (C).

The control terminal 10 detects a multipath by the same method as in FIG. 9. That is, the control terminal 10 extracts the path 1 from the "host terminal (A)" to the "host terminal (B)" through the "L2 switch (C)", the "L2 switch (A)", and the "L2 switch (B)". Moreover, the extraction unit 21 extracts the path 2 from the "host terminal (A)" to the "host terminal (B)" through the "L2 switch (C)", the "L2 switch (D)", and the "L2 switch (B)".

Then, the extraction unit 21 of the control terminal 10 refers to the link information table 14b to detect a fault having occurred between the L2 switch (A) and the L2 switch (C). The fault information can be acquired regularly by the SNMP. Thereafter, the extraction unit 21 specifies the fact that the link "L2 switch (A)-L2 switch (C)" having the fault is on the path 1. Consequently, the extraction unit 21 specifies the fact that the number of paths functioning normally is one.

Then, the extraction unit 21 refers to the link information table 14b regarding the path 2 functioning normally to acquire the transmission speed "20 Gbps" between the "host terminal (A)" and the "L2 switch (C)". Similarly, the extraction unit 21 acquires the transmission speed "10 Gbps" between the "L2 switch (C)" and the "L2 switch (D)". Similarly, the extraction unit 21 acquires the transmission speed "10 Gbps" between the "L2 switch (D)" and the "L2 switch (B)". Similarly, the extraction unit 21 acquires the transmission speed "20 Gbps" between the "L2 switch (B)" and the "host terminal (B)". As a result, the extraction unit 21 can acquire "10 Gbps" as the minimum transmission speed of the path 2 and "20 Gbps" as the maximum transmission speed of the path 2.

As a result, the extraction unit 21 extracts the facts that the current number of multipath is "one", the maximum transmission speed is "20 Gbps", which is acquired by adding the minimum transmission speeds of both paths, and the current transmission speed is "10 Gbps", which is acquired by adding the minimum transmission speeds of both paths. That is, the extraction unit 21 extracts the facts that 20 Gbps is available in the entire multipath and the path 1 in such 20 Gbps is not a target for use currently. Then, as illustrated in FIG. 11, the extraction unit 21 displays the multipath state, the maximum transmission speed, the current transmission speed, and fault information on the display unit 13 or transmits them to a user terminal. The display format of information displayed here can be set and changed arbitrarily.

In this manner, the control terminal 10 of the second embodiment can detect a multipath between specified nodes and extract fault information on the detected multipath, information of available lines, etc. Thus, the control terminal 10 can display, for a user or other people, not only information of the multipath but also the fault information, etc., for each path forming the multipath. When the maximum transmission speed is not available such as when a fault occurs, it is possible to grasp a transmission speed between two nodes that is available at that time.

[c] Third Embodiment

Figure 12:
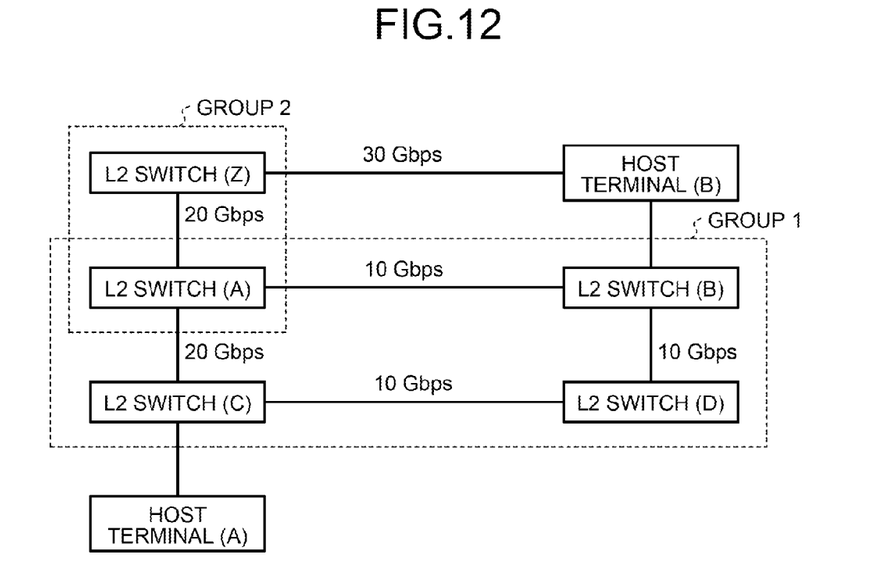
FIG. 12 is a diagram illustrating an example of a network configuration.

The third embodiment describes an example of route search using a network configuration different from that in the first embodiment and the second embodiment. FIG. 12 is a diagram illustrating an example of a network configuration. As illustrated in FIG. 12, the network is a layer 2 network including the host terminal (A), the host terminal (B), the L2 switch (A), the L2 switch (B), the L2 switch (C), the L2 switch (D), and an L2 switch (Z).

In the network, the host terminal (A) and the L2 switch (C), the L2 switch (C) and the L2 switch (A), and the L2 switch (C) and the L2 switch (D) are connected to each other, respectively. Similarly, the L2 switch (A) and the L2 switch (B), the L2 switch (B) and the L2 switch (D), and the L2 switch (B) and the host terminal (B) are connected to each other, respectively. Similarly, the L2 switch (A) and the L2 switch (Z), and the L2 switch (Z) and the host terminal (B) are connected to each other, respectively.

Moreover, as the grouping of the L2 switches in the network, the L2 switch (A), the L2 switch (B), the L2 switch (C), and the L2 switch (D) belong to a group 1, and the L2 switch (A) and the L2 switch (Z) belong to a group 2. That is, the L2 switch (A) belongs to both groups, and it is supposed that the communication across groups is not performed. The grouping can be set and changed arbitrarily, and FIG. 12 illustrates merely an example.

The following will describe an example in which the control terminal 10 detects paths from the host terminal (A) to the host terminal (B) in such conditions. Here, the control terminal 10 has collected topology information and already has the device information table 14a and the link information table 14b.

The acquisition unit 19 of the control terminal 10 refers to the link information table 14b to specify the L2 switch (C) as an adjacent node connected to the host terminal (A). Similarly, the acquisition unit 19 refers to the link information table 14b to specify the L2 switch (B) as an adjacent node connected to the host terminal (B). Thus, the acquisition unit 19 associates "host terminal (A), L2 switch (C)" and "L2 switch (B), host terminal (B)" as "relay source node, relay destination node", and stores them in the work area of the storage unit 14.

Subsequently, the acquisition unit 19 specifies the SNMP community name "Public3" of the L2 switch (C) based on the device information table 14*a* and performs SNMP access relative to the L2 switch (C) while specifying the "Public3" as an SNMP community name. Thereafter, the acquisition unit 19 acquires an entry of the FDB as a MIB from the L2 switch (C) and specifies the L2 switch (A) and the L2 switch (D) as the next relay destination nodes based on the acquired MIB. Here, the search unit 20 determines that the specified L2 switch (A) and L2 switch (D) do not match the adjacent node of the host terminal (A) or the adjacent node of the host terminal (B) and they are nodes that have not been acquired. Thus, the acquisition unit 19 associates "L2 switch (C), L2 switch (A)" and "L2 switch (C), L2 switch (D)" as "relay source node, relay destination node", and stores them in the work area of the storage unit 14.

Subsequently, the acquisition unit 19 specifies the SNMP community name "Public1" of the L2 switch (A) based on the device information table 14*a*, and performs SNMP access relative to the L2 switch (A) while specifying the "Public1" as an SNMP community name. Thereafter, the acquisition unit 19 acquires an entry of the FDB as a MIB from the L2 switch (A) and specifies the L2 switch (C) and the L2 switch (B) as the relay destination nodes of the L2 switch (A) based on the acquired MIB.

That is, although the L2 switch (A) is physically connected to each of the L2 switch (B), the L2 switch (C), and the L2 switch (Z), the L2 switch (Z) is not registered in the FDB, and thus the L2 switch (A) does not recognize the L2 switch (Z) as the next relay destination node. As a result, the L2 switch (A) makes a response with the L2 switch (C) and the L2 switch (B) to the SNMP access received from the control terminal 10, without making a response with the L2 switch (Z). The subsequent processing performed by the control terminal 10 is same as in FIG. 9. Thus, the detailed explanation thereof is omitted. In this manner, it is possible that the control terminal 10 extracts not physical connection information but data relay routes themselves and thus detects a multipath in the network.

[d] Fourth Embodiment

The embodiments of the invention have been described. However, the invention may be implemented in various forms other than those of the embodiments described above. Then, different embodiments will be explained in the following.

Application to Virtual Machines

Recently, there has been used live migration by which a virtual machine used widely in cloud computing, etc., is dynamically moved among physical machines. In the conventional method of monitoring links between nodes, when a virtual machine is moved to another physical machine by live migration, the settings of virtual switches and physical switches are changed so as to monitor the moved virtual machine.

In contrast to the conventional technique, the techniques in the first embodiment to the third embodiment can be employed to monitor a virtual machine as one node, for example. Then, when the live migration has been performed, performing the route search described above makes the live migration of the virtual machine traceable. Thus, the paths between virtual machines can be detected correctly. Moreover, a user can monitor the states of virtual machines and virtual networks that are used on a cloud computer.

Trigger to Perform Processing

For example, as a trigger to perform the processing described in the first embodiment and the second embodiment, arbitrary timing can be used such as when a user has made an instruction, when an administrator of a network has made an instruction, when a fault has occurred, and when a monitoring cycle has been reached.

System

Among the various kinds of processing described in the embodiments, the processing performed automatically in the description may be entirely or partially performed manually. Alternatively, the processing performed manually in the description may be entirely or partially performed automatically by known methods. In addition, the processing procedures, control procedures, concrete terms, and various kinds of information including data and parameters in the description or the drawings can be modified arbitrarily unless otherwise specified.

The illustrated components of each device are based on the functional concept, and are not always physically configured as illustrated in the drawings. That is, the concrete form of distribution and integration of the devices is not limited to the form illustrated in the drawings. In other words, the entire of the device or one part thereof may be distributed or integrated functionally or physically in an arbitrary unit, depending on various loads, a use state, etc. Furthermore, regarding the processing functions performed in devices, the entire of them or any part of them may be achieved by the CPU and a program analytically executed by the CPU, or may be achieved as hardware by the wired logic.

Hardware Configuration

The various kinds of processing described in the above embodiments can be achieved by executing a preliminarily-prepared program in a computer system such as a personal computer and a work station. The following will describe an example of a computer system that executes a program having the same functions as in the embodiments described above.

Figure 13:
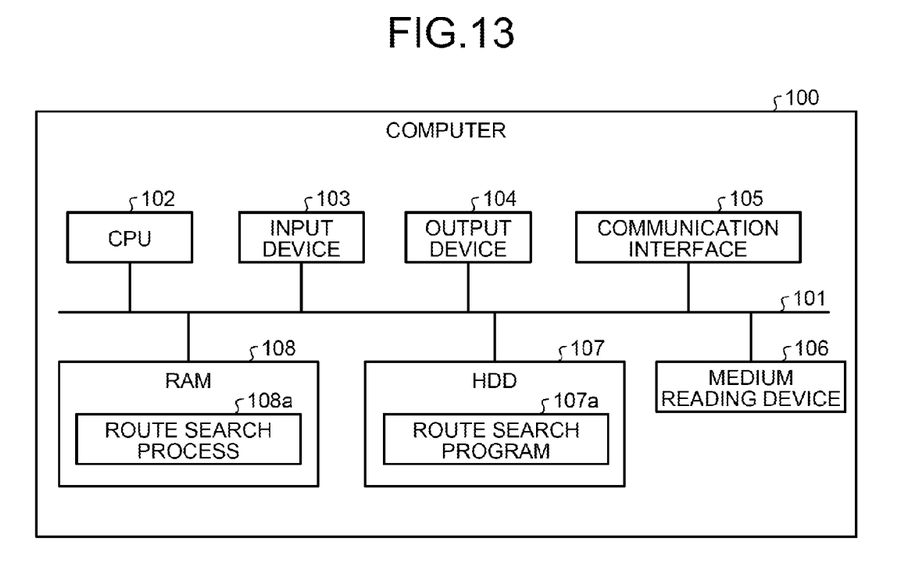
FIG. 13 is a diagram illustrating an example of a hardware configuration of a computer executing a route search program.

FIG. 13 is a diagram illustrating an example of a hardware configuration of a computer that executes a route search program. As illustrated in FIG. 13, a computer 100 includes a CPU 102, an input device 103, an output device 104, a communication interface 105, a medium reading device 106, a hard disk drive (HDD) 107, and a random access memory (RAM) 108. The units illustrated in FIG. 13 are connected to one another through a bus 101.

The input device 103 is a mouse or a keyboard. The output device 104 is a display, etc. The communication interface 105 is an interface such as a network interface card (NIC). The HDD 107 stores the tables, etc., illustrated in FIG. 2 together with a route search program 107*a*. Although the HDD 107 is exemplified as a recording medium, it is also possible that various programs are stored in another computer readable recording medium such as a read only memory (ROM), a RAM, and a compact disk read only memory (CD-ROM) so that a computer reads out them. It is also possible that a recording medium is arranged in a remote location and a computer accesses the recording medium to acquire and use programs. Here, the acquired programs may be stored in a recording medium of the computer itself to use them.

The CPU 102 reads out the route search program 107*a* and loads it on the RAM 108 so as to operate a route search process 108*a* performing the functions described in FIG. 2, etc. That is, the route search process 108*a* performs the functions same as the address range reception unit 16, the topology information collection unit 17, the both-end reception unit 18, the acquisition unit 19, the search unit 20, and the extraction unit 21 that are illustrated in FIG. 2. In this manner, the computer 100 functions as an information processing apparatus that performs a route search method by reading out the program and executing it.

For example, the computer 100 may read out the route search program from the recording medium through the medium reading device 106 and execute the read-out route search program so as to achieve the same functions as in the embodiments described above. The program in the other embodiments is not always executed by the computer 100. For example, the invention can be applied similarly also when another computer or a server executes the program or when they execute the program in a cooperated manner.

It is possible to monitor each path of a multipath constituting a network.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a route search program causing a computer to execute a process comprising:
    searching a first adjacent node adjacent to a first node among nodes constituting a layer 2 network based on connection information between the nodes;
    acquiring node information from the searched first adjacent node, the node information indicating an adjacent node to be selected as a relay destination of data by each of the nodes;
    determining whether the acquired node information is of a second node among the nodes constituting the layer 2 network, and when the acquired node information is not of the second node, acquiring, from a second adjacent node specified by the node information acquired from the first adjacent node, node information of a node to be selected as a relay destination of the data by the second adjacent node and determining whether the acquired node information is of the second node; and
    extracting each route on which data is relayed in the layer 2 network by extracting, when the node information corresponding to the second node is detected as the node information at the determining, a route from the first node to the second node on which the data is relayed, based on the node information acquired before the second node is detected.

2. The non-transitory computer-readable recording medium according to claim 1, wherein the determining is finished when the acquired node information has been already acquired.

3. The non-transitory computer-readable recording medium according to claim 1, the process further comprises:
    receiving fault notification from each of the nodes constituting the layer 2 network, wherein
    the extracting includes extracting, among the routes extracted using the node information acquired before the second node is detected, a route not passing a node from which the fault notification has been received as a route from the first node to the second node on which the data is relayed.

4. The non-transitory computer-readable recording medium according to claim 1, wherein the extracting includes displaying each of the extracted routes from the first node to the second node on a display unit.

5. The non-transitory computer-readable recording medium according to claim 1, wherein the extracting includes extracting a minimum transmission speed based on line information acquired from each of the nodes constituting the layer 2 network and displaying a value acquired by adding the extracted transmission speeds or a minimum transmission speed on communicable routes among the routes on a display unit.

6. An information processing apparatus comprising:
    a memory that stores therein connection information between nodes constituting a layer 2 network; and
    a processor coupled to the memory, wherein the processor executes a process comprising:
    searching a first adjacent node adjacent to a first node among the nodes constituting the layer 2 network based on the connection information between the nodes;
    acquiring node information from the searched first adjacent node, the node information indicating an adjacent node to be selected as a relay destination of data by each of the nodes;
    determining whether the acquired node information is of a second node among the nodes constituting the layer 2 network, and when the acquired node information is not of the second node, acquiring, from a second adjacent node specified by the node information acquired from the first adjacent node, node information of a node to be selected as a relay destination of the data by the second adjacent node and determining whether the acquired node information is of the second node; and
    extracting each route on which data is relayed in the layer 2 network by extracting, when the node information corresponding to the second node is detected as the node information at the determining, a route from the first node to the second node on which the data is relayed, based on the node information acquired before the second node is detected.

\* \* \* \* \*